P. Pratt.
Horse Rake.

Nº 14067         Patented Jan. 8, 1856.

Witnesses,
Thos H Speakman
Edward Speakman

Inventor.
Prindal Pratt

UNITED STATES PATENT OFFICE.

RANDAL PRATT, OF MARPLE TOWNSHIP, DELAWARE COUNTY, PA.

IMPROVEMENT IN HORSE HAY-RAKES.

Specification forming part of Letters Patent No. 14,067, dated January 8, 1856.

*To all whom it may concern:*

Be it known that I, RANDAL PRATT, of the township of Marple, Delaware county, Pennsylvania, have invented a new and Improved Hay-Rake to be used with Horse-Power; and I do hereby declare that the following is a full, clear, and exact description of the construction and operation of the same, reference being had to the annexed drawings, making a part of this specification, in which—

Figure 2:
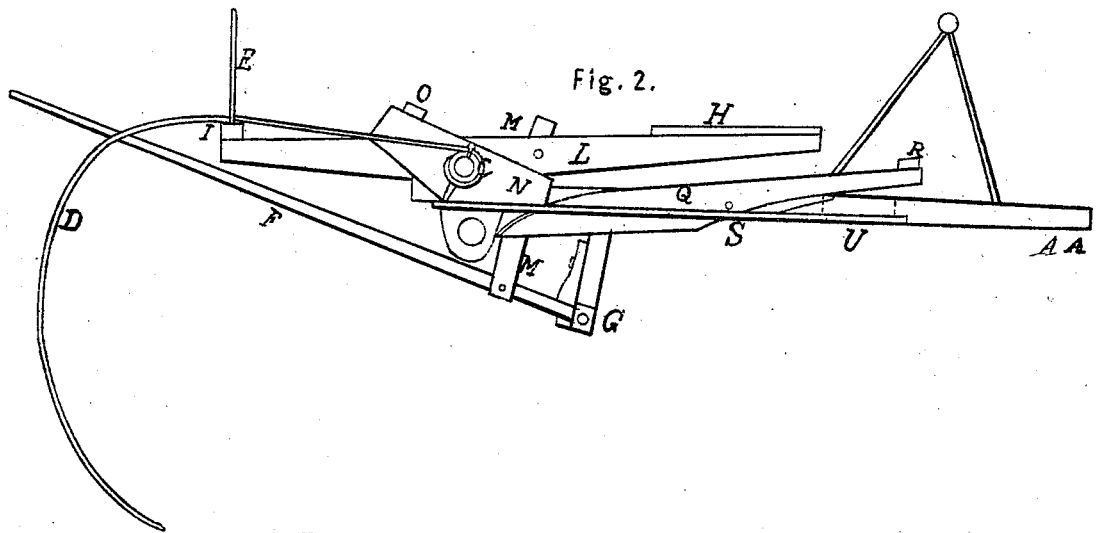
Figure 1:
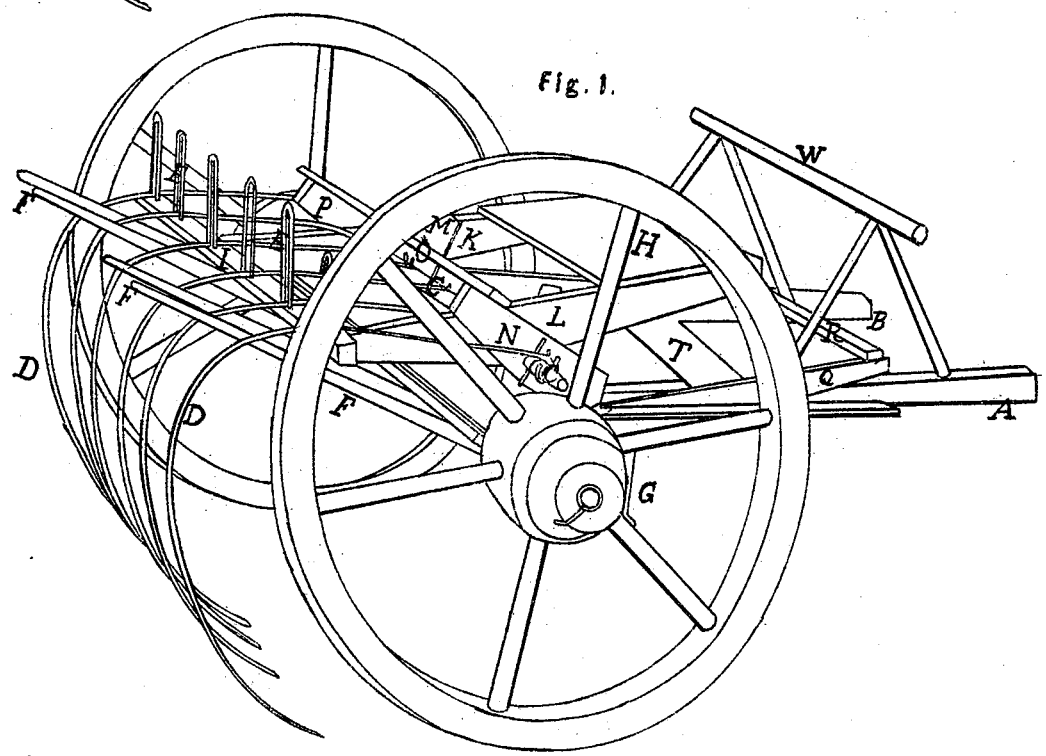

Figure 1 is a perspective view, and Fig. 2 a section exhibiting a concise view of the most material parts.

In the construction of my rake I first prepare a pair of wheels about three and one-half feet in height, and an axle, as represented in Fig. 1, the length of the axle between the naves being eight feet.

To the front of the axle are affixed the shafts A B, about four feet three inches apart, and of sufficient length to allow a space of about two feet nine inches next the axle clear of the horse, for which distance they are made parallel with each other for the purposes of the other parts of machine, to be hereinafter described; or the shafts may be made of straight pieces having the proper width at the points and the other parts adjusted accordingly.

Over the main axle, and secured to it by studs or posts, is a rod or axle, (marked C C,) extending the whole length between the wheels, to which the teeth of the rake are attached by any form of movable joint, so that each one may move up or down independent of the rest. This rod also forms the center of motion of the apparatus for raising and depressing the teeth, to be hereinafter described.

The teeth (represented by D D) are made of steel rods about four feet two inches in length and three-eighths of an inch in diameter, and are curved, as represented in the figure, so as to have at the points a proper inclination to the ground, and are tempered or hardened. The teeth are four and one-half inches apart.

Under the axle is a simple frame of wood, extending the length of the rake, with projecting prongs, which may be of wood or iron, as represented by F F F, the office of which is to press the hay to the ground so as to clear the points of the teeth by a downward motion simultaneously with the raising of the rake-teeth. This frame is supported at the forward end by a movable connection with studs projecting downward from each of the shafts, as represented at G, and is also connected with the frame H I K L by means of an inflexible bar on each side, as represented at M, being connected at each end by a circular pin or bolt, so as to admit of freedom of motion.

H I K L represent a frame operating in the form of a lever inside of the shafts, its center of motion being the rod C C, the purpose of which is, by the operator applying his foot to the part represented by H, simultaneously to raise the rake-teeth and depress the prongs F F F, in order to clear the hay from the teeth and deposit it at the proper point, and press it together on the ground and make it lie close, so as not to be blown about by the wind. Besides, it can be rolled together or pitched into a cart with greater facility after being so pressed together. Into the hindermost part of this frame (marked I) are inserted the staples E E, which steady the teeth and keep them firmly to their places.

N O P and Q R represent an appliance operating as a compound lever, placed on the outside of the shafts, or it may be on the inside, the purpose of which is to press the teeth to the ground when from the character of the ground or the material to be raked this may be required. The part N O P has its center of motion in the rod C C, which passes through it, and the part Q R has its center of motion in the shafts, as represented at S, Fig. 2. The foot of the operator applied at R brings the part O down upon the teeth and gives the required pressure.

T represents a platform, which is the standing-place for the operator, and at the same time serves as a brace for the shafts. It occupies the space in the shafts between the dotted lines, as represented at U, Fig. 2.

W represents a support for the operator.

From what has been said in explaining the construction of the rake its operation is apparent. Being put in motion by the horse, the teeth D D proceed to gather up the hay, grain, or other matter to be collected together. The rake being full, the operator, standing upon T, applies his foot to H, and simultaneously the teeth are raised from the ground and the prongs F F F brought down upon the contents of the teeth, which are thus cleared and made ready to renew the operation. If it is desired to press the teeth to the ground, the operator applies his foot to R and the effect is produced.

The form of teeth which I use possess great advantages in regard to passing over stones, stumps, or other obstructions. Owing to the great elasticity they possess from the length of curve and the material of which they are composed, they readily pass over any such obstructions and renew their proper position with little danger of bending or breaking.

What I claim as my invention, and desire to secure by Letters Patent, is—

Hanging the prongs or clearers F F so that they can vibrate, and connecting them to the devices which operate the teeth so that they will be vibrated in an opposite direction simultaneously with the teeth to clear them of the crop gathered and press it together on the ground, as set forth.

RANDAL PRATT.

Witnesses:
H. L. ROCKEY,
O. E. STRICKLAND.